United States Patent
Collier

(10) Patent No.: US 6,209,815 B1
(45) Date of Patent: Apr. 3, 2001

(54) LEFT AND RIGHT DRAG ADJUSTABLE FISHING REEL

(75) Inventor: John L. Collier, Wilton Manors, FL (US)

(73) Assignee: Ligi Tool and Engineering, Inc., Pompano Beach, FL (US)

(*) Notice: Subject to any disclaimer, the term of this patent is extended or adjusted under 35 U.S.C. 154(b) by 0 days.

(21) Appl. No.: 09/550,136

(22) Filed: Apr. 17, 2000

(51) Int. Cl.[7] .................................................. A01K 89/02
(52) U.S. Cl. ........................................... 242/303; 242/317
(58) Field of Search .................................. 242/317, 318, 242/322, 285, 287, 295, 303, 306, 309

(56) References Cited

U.S. PATENT DOCUMENTS

| | | | |
|---|---|---|---|
| 1,815,382 | * | 7/1931 | Russel .................................. 242/317 |
| 2,858,998 | * | 11/1958 | Nadolskey ............................ 242/317 |
| 3,765,618 | * | 10/1973 | Johnson et al. ....................... 242/317 |
| 4,657,201 | * | 4/1987 | Munroe ................................... 42/295 |
| 4,715,555 | * | 12/1987 | McChristian, Jr. .................. 242/295 |
| 4,728,054 | * | 3/1988 | Pisapio ................................. 242/317 |
| 4,750,687 | * | 6/1988 | Sievert et al. ........................ 242/317 |
| 5,482,221 | * | 1/1996 | Peterson et al. ..................... 242/285 |
| 5,556,049 | * | 9/1996 | Bennett et al. ....................... 242/318 |
| 5,590,847 | * | 1/1997 | Ament ................................... 242/317 |
| 5,609,309 | * | 3/1997 | Oh ......................................... 242/317 |
| 5,626,303 | * | 5/1997 | Bringsen .............................. 242/317 |
| 5,918,826 | * | 7/1999 | Arkowski ............................. 242/317 |

FOREIGN PATENT DOCUMENTS

| | | | |
|---|---|---|---|
| 170949 | * | 11/1921 | (GB) .................................... 242/317 |
| 2220337 | * | 1/1990 | (GB) .................................... 242/285 |

\* cited by examiner

*Primary Examiner*—Emmanuel M. Marcelo
(74) *Attorney, Agent, or Firm*—Alvin S. Blum

(57) ABSTRACT

A fishing reel has a housing for rigidly mounting on a fishing rod. A line spool is rotatably mounted in the housing. A handle is affixed to one side of the housing for winding in line. An antireverse mechanism allows winding in line and stops free release of line. An adjustable friction clutch, or drag, allows release of line when pull exceeds a preset force. Adjustment of the drag force setting is achieved by two adjusting knobs, one on each side of the reel. This enables the angler to hold the rod in either hand while using the free hand to adjust the drag.

12 Claims, 2 Drawing Sheets

LEFT AND RIGHT DRAG ADJUSTABLE FISHING REEL

BACKGROUND OF THE INVENTION

This invention relates to reels, and more particularly to fishing reels with friction drags to resist line release in which the degree of resistance may be adjusted with either hand while playing a fish.

DESCRIPTION OF THE PRIOR ART

Fishing reels are frequently made with a one way drive for reeling in line and an antireverse mechanism to prevent release of line. They incorporate an adjustable friction clutch to allow line to be released when a pull on the line exceeds a preset tension. The setting of the tension, or drag, is generally made by an adjusting device extending outward from one side of the line spool. When the reel is made for use by a right handed operator, the fishing rod is held in the right hand, and the reel winding handle and drag adjuster are positioned for operation by the weaker left hand. When the right hand tires from fighting a fish, the operator may transfer the rod to the left hand. If it then becomes necessary to adjust the drag, the rod must be transferred back to the right hand before the drag can be adjusted. The delay may result in losing the fish.

SUMMARY OF THE INVENTION

It is accordingly an object of the invention to provide a fishing reel having a drag adjustment that may be operated by either hand at any time. The reel of the invention had two drag adjustment controls, one on the left side and one on the right side. Each one controls the same friction drag in the reel by turning either control and the degree of turning affects the same amount of adjustment of the drag. The reel is provided with a simple adjustment to make it either a right handed or a left handed reel. This makes the reel more versatile and reduces production costs by eliminating the cost of making two models. These and other objects, features, and advantages of the invention will become more apparent when the detailed description is studied in conjunction with the drawings in which like elements are designated by like reference characters in the various drawing figures.

DETAILED DESCRIPTION OF PREFERRED EMBODIMENTS

Figure 1:
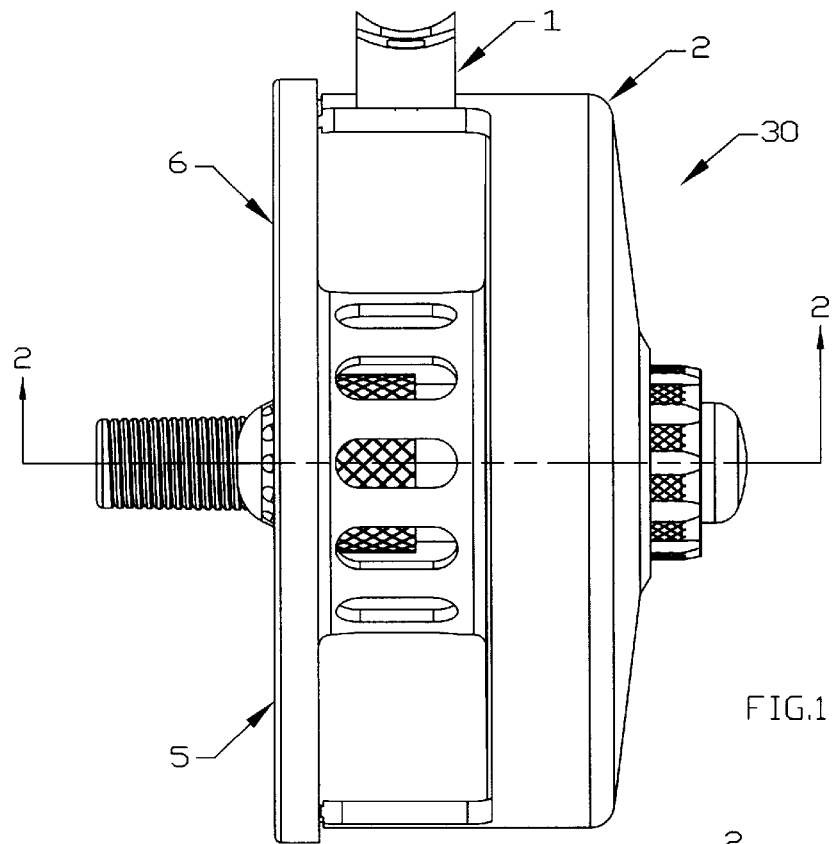
FIG. 1 is a front elevation view of the reel of the invention.
Figure 2:
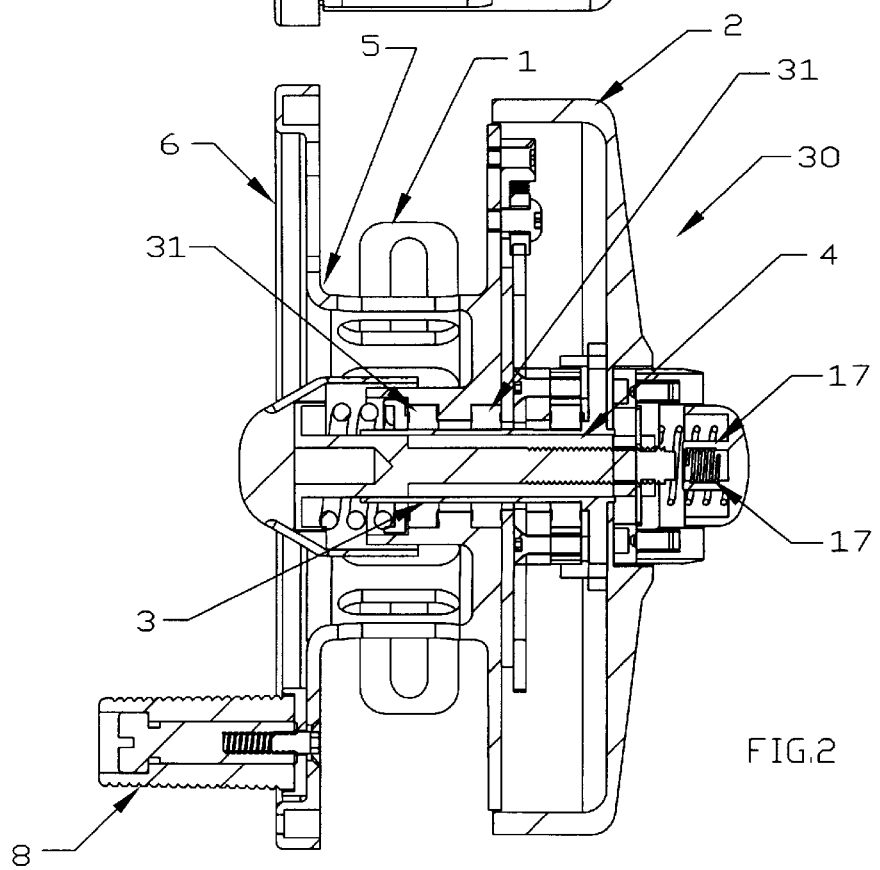
FIG. 2 is a sectional view taken through line 2—2 of FIG. 1.
Figures 3, 4:
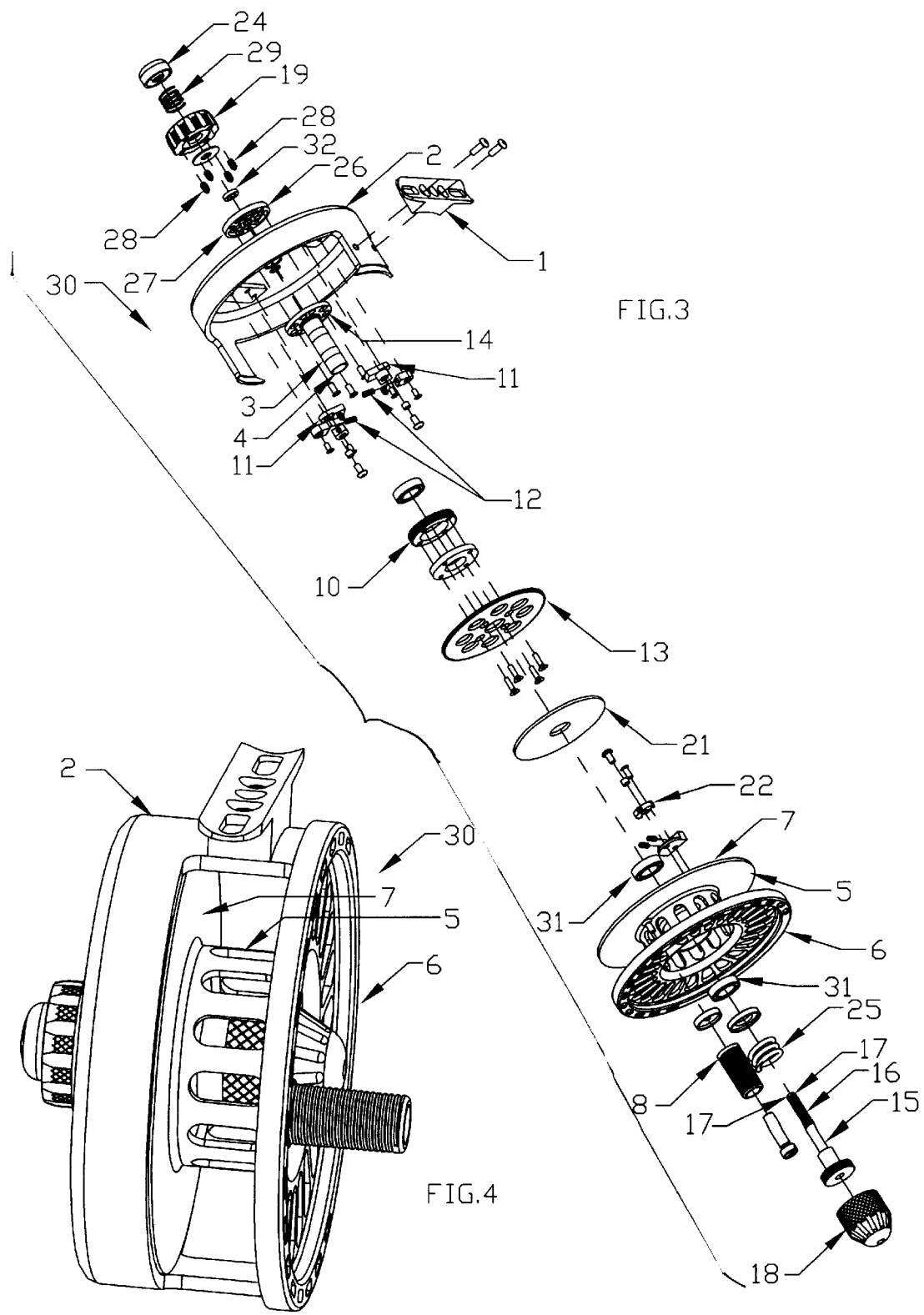
FIG. 3 is an exploded view of the reel.
FIG. 4 is an isometric view of the reel.

Referring now to the drawings, a reel 30 of the invention is of the type generally referred to as a fly reel, for attachment to a fly fishing rod (not shown) below the handle of the rod by base 1 of the reel. Housing 2 is affixed to the base. Housing 2 supports cylindrical axle 3, which has a flange 14 at a first end, a free second end, and a central passage 4 therethrough. A line spool 5 holds the fishing line (not shown) between a first flange or side 6 and a second side 7. It is rotatably mounted on axle 3 with ball bearings 31 pressed into the reel. A handle 8 having a fine cylindrical spiral thread surface 9 is attached to first side 6 for manual retrieval of line. The spiral groove facilitates moisture removal from the handle.

Rotatably mounted on axle 3 are antireverse gear 10, clicker gear 13 and cork friction disc 21. Antireverse dogs 11 are pivotally mounted on the inside wall of housing 2 with springs 12 that cooperate with antireverse gear 10 to provide free rotation in either one of the two directions while preventing rotation of the gear in the other direction, with the direction being selectable during mounting of the gear to enable the reel to be used by either a right handed or left handed angler, as is well known in the art. A draw bar 15 has a first adjusting knob 18 affixed to a first end, and a threaded second end 16 with two parallel flats 17. The draw bar passes through spring 25 and the central passage 4 in the axle. The threaded end extends past the housing. Mounted thereon are detent plate 26, thrust washer 32, second adjusting knob 19, spring 29, and threaded end cap 24. Flange 14 and detent plate 26 are bolted together with the housing. Knob 19 has an aperture with two flat sides to correspond to the flats on the draw bar so that the knob is free to move axially on the draw bar but rotates with the draw bar. It is provided with spring loaded ball projections 28 to cooperate with apertures 27 in detent plate 26 to provide resilient angular stops as either of the adjusting knobs is rotated. A female thread in either the flange 14 or the detent plate 26 cooperates with the thread 16 on the draw bar 15 to force the spring 25 and the spool 5 against the housing with adjustable spring bias. Either adjusting knob 18 or 19 may be rotated to accomplish this, since they rotate together. Antireverse gear 10 and dog 11 cooperate to enable free rotation in a first direction for winding in line with handle 8, and prevent rotation of gears 10 and 13 in the opposite direction when line is being pulled by a fish. Friction disc 21, of cork or other suitable material, will frictionally couple rotation forces between spool 5 and antireverse gear 10, preventing rotation of the spool until the pull on the line exceeds a force preset by the tension on spring 25. Rotation of either drag adjusting knob will permit the angler to adjust this force, and the degree of adjustment will be the same with the same angle of rotation of either knob. The detent mechanism enables the angler to feel the degree of angular rotation. When the spool rotates relative to the housing, the clicker gear 13 cooperates with the dog 22 to produce a sound, as is well known in the art.

When fighting a fish, it is often useful to switch hands holding the rod. By having the drag adjustment accessible from either side of the reel, the angler can continue to adjust the drag as needed with the free hand.

The above disclosed invention has a number of particular features which should preferably be employed in combination, although each is useful separately without departure from the scope of the invention. While I have shown and described the preferred embodiments of my invention, it will be understood that the invention may be embodied otherwise than as herein specifically illustrated or described, and that certain changes in form and arrangement of parts and the specific manner of practicing the invention may be made within the underlying idea or principles of the invention.

What is claimed is:

1. A fishing reel comprising:
   a) a base for mounting on a rod;
   b) a housing extending from the base;
   c) an axle attached to the housing, the axle having an axis and a central passage along the axis;
   d) a line spool having a first side and a second side, the spool rotatably mounted on the axle;

e) a handle connected to the first side of the spool for rotating the spool on the axle;

f) a gear rotatably mounted on the axle between the housing and the second side of the spool;

g) an antireverse assembly pivotally connected to the housing and engaging the gear so as to permit the gear to rotate freely in one of two selectable directions and to prevent rotation in the other of the two directions;

h) a threaded draw bar passing through the central passage and having a first end with a first adjusting knob affixed thereto beside the first side of the spool and a second end outside the housing past the second side of the spool, the draw bar threadedly engaging the housing past the spool and before the second end;

i) a second adjusting knob removably attached to the second end so as rotate in concert with the draw bar and the first knob; and j) a friction disc rotatably mounted on the axle between the gear and the second side of the spool.

2. The reel according to claim 1, further comprising a clicker gear affixed to the housing for cooperating with a sounder affixed to the spool.

3. The reel according to claim 2, in which the second end of the draw bar is provided with at least one flat for cooperating with a correspondingly shaped aperture in the second knob to ensure that rotation of each one of the two knobs produces the same degree of rotation of the draw bar.

4. The reel according to claim 3, further comprising an end cap threadedly mounted on the termination of the second end of the draw bar past the second knob for securing the second knob in place.

5. The reel according to claim 1, in which the handle comprises an elongate cylinder with a cylindrical surface having a fine spiral thread.

6. A fly fishing reel comprising:

a) a base for mounting on a rod;

b) a housing extending from the base;

c) an axle attached to the housing, the axle having an axis and a central passage along the axis;

d) a line spool having a first side and a second side, the spool rotatably mounted on the axle;

e) a handle connected to the first side of the spool for rotating the spool on the axle;

f) a gear rotatably mounted on the axle between the housing and the second side of the spool;

g) an antireverse assembly pivotally connected to the housing and engaging the gear so as to permit the gear to rotate freely in one of two selectable directions and to prevent rotation in the other of the two directions;

h) a threaded draw bar passing through the central passage and having a first end with a first adjusting knob affixed thereto beside the first side of the spool and a second end outside the housing past the second side of the spool, the draw bar threadedly engaging the housing past the spool and before the second end;

i) a second adjusting knob removably attached to the second end so as rotate in concert with the draw bar and the first knob;

j) a friction disc rotatably mounted on the axle between the gear and the second side of the spool; and k) at least one spring bias means mounted on the draw bar so that rotation of either one of the adjusting knobs moves the draw bar relative to the housing to move the first knob and the spool toward or away from the friction disc and the housing with greater or lesser spring bias, thereby increasing or decreasing the force with which the friction disc restricts rotation of the spool in the other direction.

7. The reel according to claim 6, further comprising a clicker gear affixed to the housing for cooperating with a sounder affixed to the spool.

8. The reel according to claim 7, in which the second end of the draw bar is provided with at least one flat for cooperating with a correspondingly shaped aperture in the second knob to ensure that rotation of each one of the two knobs produces the same degree of rotation of the draw bar.

9. The reel according to claim 8, further comprising an end cap threadedly mounted on the termination of the second end of the draw bar past the second knob for securing the second knob in place.

10. The reel according to claim 9, further comprising a spring-biased detent mechanism operatively interposed between at least one of the first and second adjusting knobs and the housing for providing a plurality of resilient angular stops during adjustment of either one of the knobs.

11. The reel according to claim 10, which the handle comprises an elongate cylinder with a cylindrical surface having a fine spiral thread.

12. The reel according to claim 6, in which the handle comprises an elongate cylinder with a cylindrical surface having a fine spiral thread.

* * * * *